Nov. 7, 1939.  M. T. THORSSON ET AL  2,178,765
AUTOMATIC SCALE
Filed Jan. 22, 1937   3 Sheets-Sheet 1

INVENTORS
BY
ATTORNEY

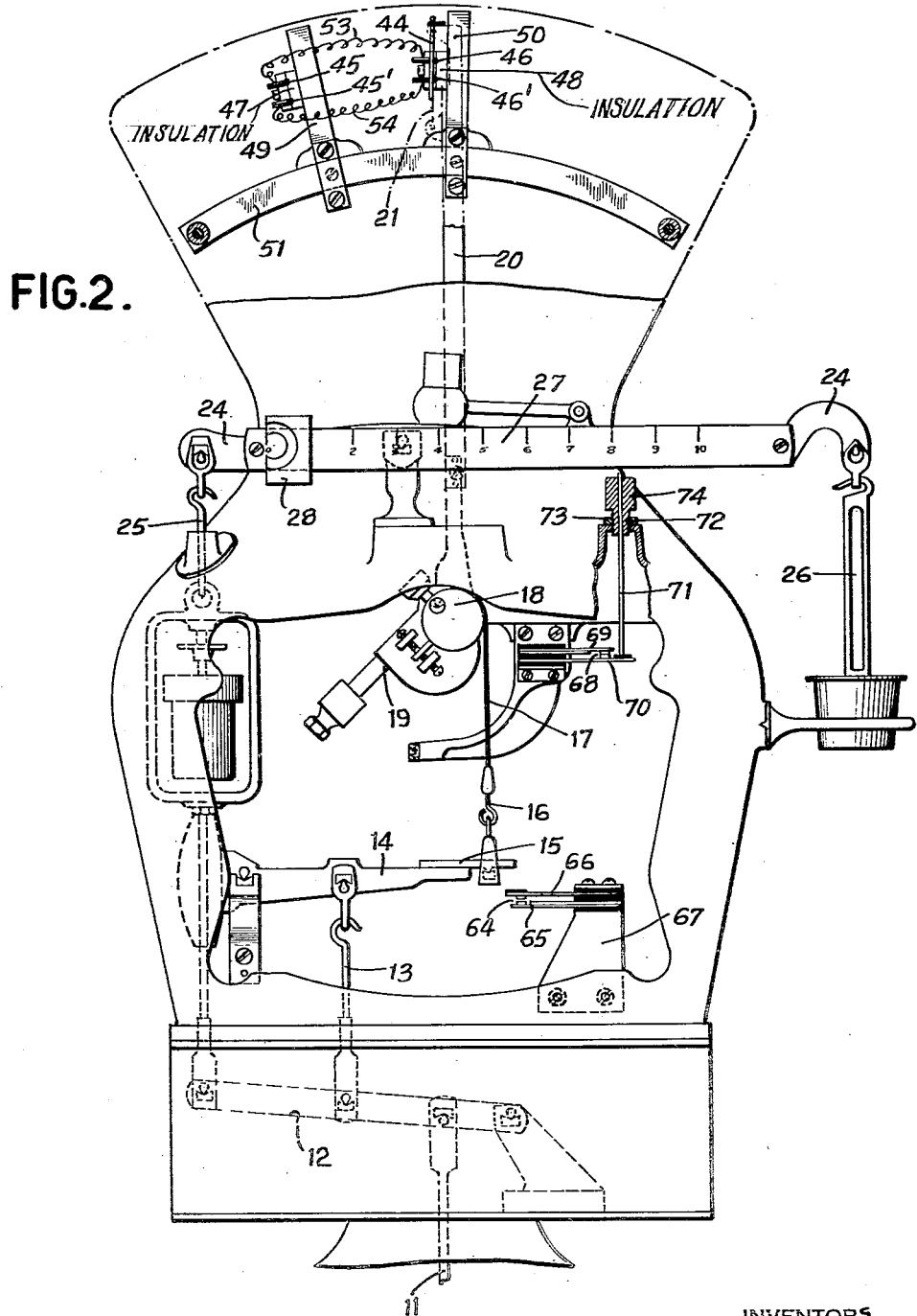

Nov. 7, 1939.  M. T. THORSSON ET AL  2,178,765
AUTOMATIC SCALE
Filed Jan. 22, 1937   3 Sheets-Sheet 3
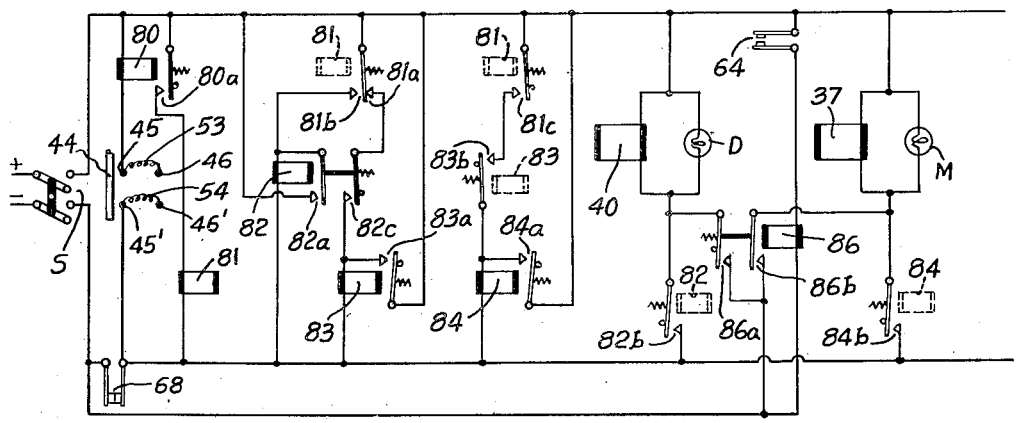
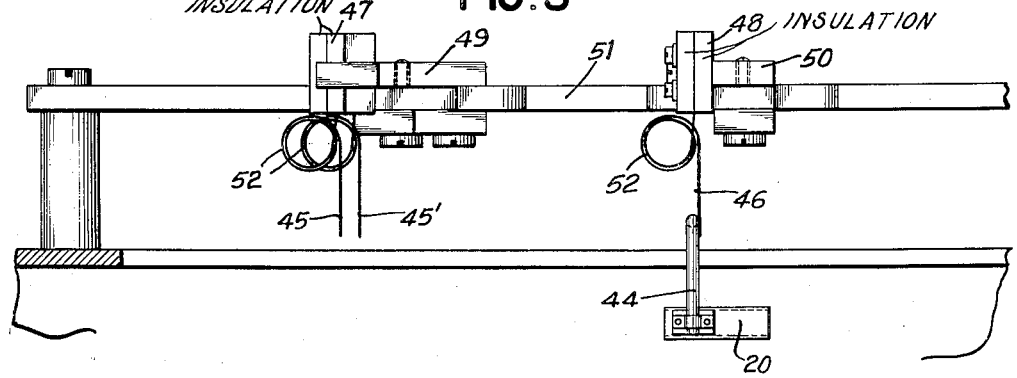
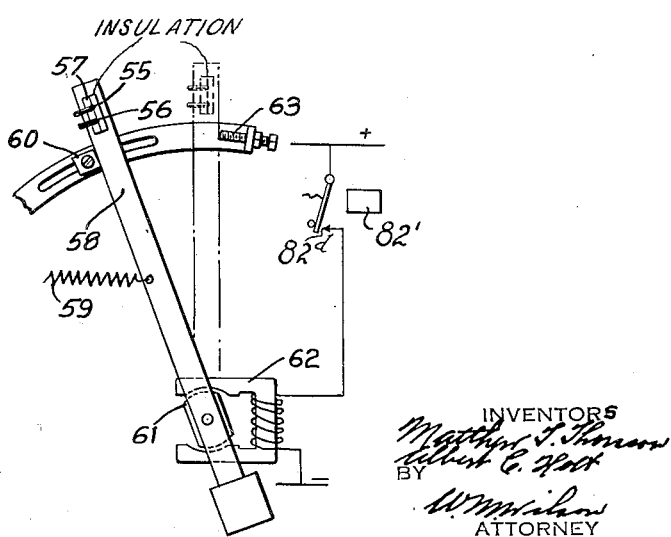

Patented Nov. 7, 1939

2,178,765

UNITED STATES PATENT OFFICE 2,178,765

AUTOMATIC SCALE

Matthew T. Thorsson, East Williston Park, Long Island, and Albert C. Holt, New York, N. Y., assignors to International Business Machines Corporation, New York, N. Y., a corporation of New York Application January 22, 1937, Serial No. 121,802

11 Claims. (Cl. 249—63)

This case relates to material flow-controlling scales or hopper scales.

It is desirable in such scales to provide for diminution of flow or feed of the material as the predetermined weight is approached. This is usually done by first providing for full flow, then at a certain point before the predetermined weight point initiating a dribble flow, and then at the predetermined weight point completely shutting off the feed. In this way, the required weight of material can be accurately measured out.

The object of the present invention is to provide improved electrical means for controlling changes in material feed.

Further, the object is to provide a primary sensitive control relay governed by action of the scale for controlling changes in feed rate of the material.

Still further, the object is to provide successive pairs of terminals, one pair at a dribble point and the other pair at the final load point to be bridged in succession by a load responsive conductor for controlling dribble flow and final cut-off.

It is also an object to provide a modification of the control contact combination which consists in using a single pair of contacts to be bridged by the load responsive conductor and movable to a more advanced load point after coaction with the conductor.

Other objects will appear from the following parts of the specification and from the drawings, in which:

Fig. 2 is a front view of the scale with the front plates removed,

Fig. 3 is a plan view of the conductor and associated parts,

Fig. 5 is a front view of a modified structure of circuit controller coacting with the scale and also shows part of the circuit of the modified controller, and Fig. 6 is a circuit diagram of the main form of the invention.

For purposes of the disclosure, the invention has been applied to a scale of the type shown in Patents Nos. 867,671, and 1,455,411.

Figure 1:
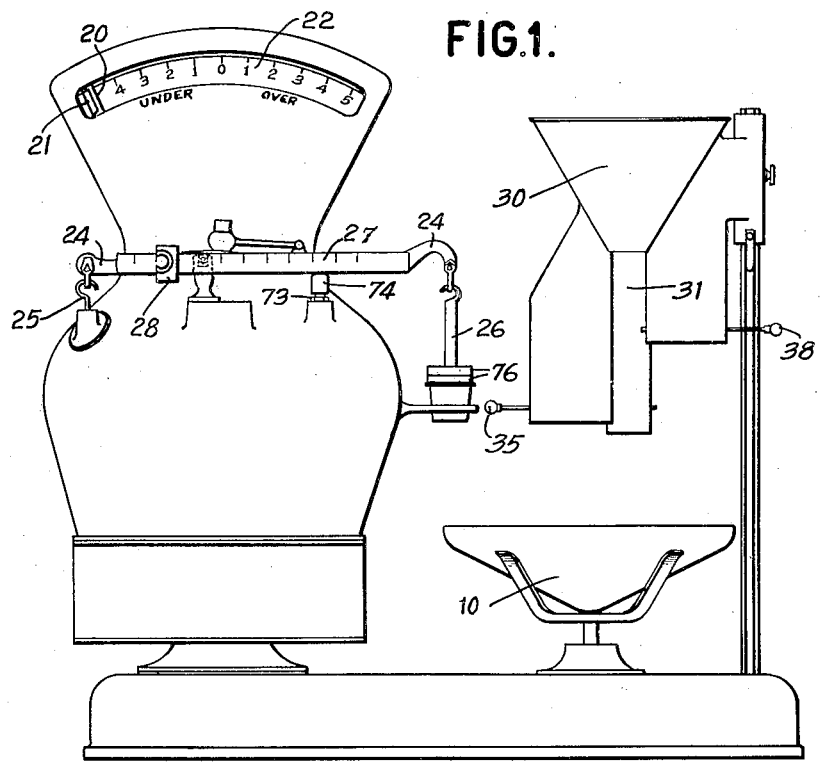
Fig. 1 is a front view of the hopper scale.

Referring to Fig. 1, the load platform or material receiver 10 is supported on a compound base lever system (not shown), connected by a draft rod 11 to an intermediate beam 12 fulcrumed at the right end. The power arm of beam 12 is connected at one point by a draft rod 13 to a movement-modifying lever 14 provided with a nose piece 15. Nose piece 15 is connected by a draft rod 16 to a tape 17 wound on the eccentric face of a pivoted pendulum hub assembly 18 carrying pendulum 19. To the hub assembly is fastened an indicator hand 20 provided with a sight or index line 21 to scan a fan chart 22. The chart is of the over and under type having a central, zero, graduation and ascending or overweight graduations to the right and descending or under-weight graduations to the left. The capacity of the chart, in the illustrated case is 5 lbs. over or under, and correspondingly the capacity of the automatic pendulum counterbalance means is 5 lbs. in either direction from a central position. Normally, the platform system is weighted to apply a pull on the pendulum system which locates the pendulum at midposition and the sight line at the central, zero, graduation.

Supplementing the pendulum counterbalance system is a settable beam counterbalance which comprises a capacity beam 24 fulcrumed intermediately and connected at the left end by a draft rod 25 to the power arm of intermediate beam 12. The right hand end of beam 24 suspends a weight hanger 26 for carrying loose weights. A graduated bar 27 fastened to beam 24 carries a sliding poise 28. The beam counterbalance is set to counteract a predetermined hopper load to be applied to platform 10. When the predetermined load has been applied, the beam is in even balance or equilibrium position, and index 21 is at the central, zero, point of chart 22. The pendulum counterbalance only comes into play as the last five pounds of the predetermined load are being weighted and serves to cause the beam 24 to move proportionally to weight increments as it approaches the even balance position. Should the hopper load be less than the predetermined amount within a five pound limit, the deficiency will be indicated by sight line 21 on the under-weight side of chart 22. If the load applied is in excess of the predetermined amount within a five pound limit, the excess will be indicated on the over-weight side of the chart.

Figure 4:
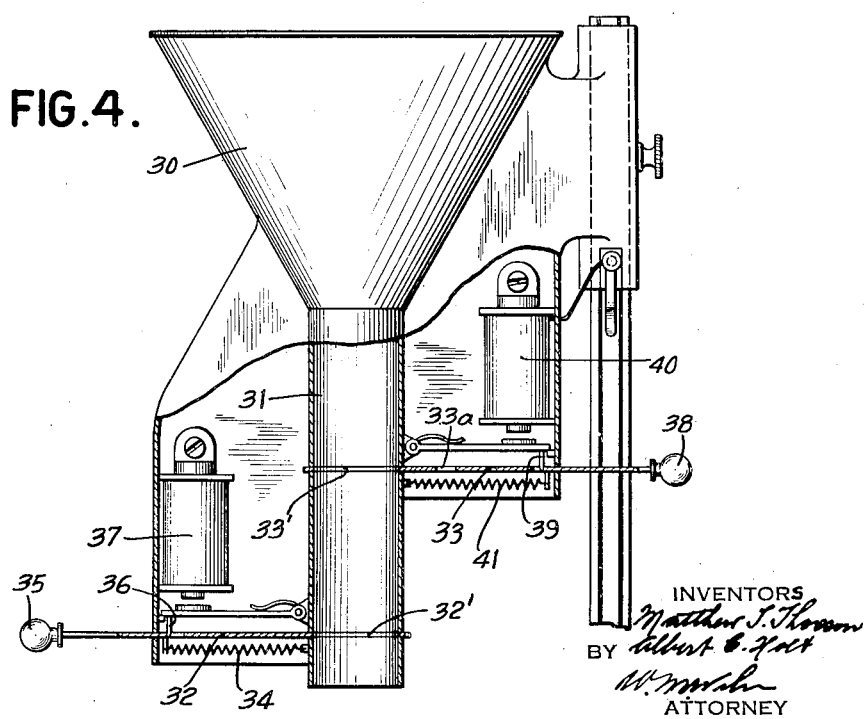
Fig. 4 is a longitudinal section through the hopper throat.

As shown in Figs. 1 and 4, a hopper 30 is above platform 10 and includes a throat 31 through which the material flows by gravity onto the platform. A pair of valves 32 and 33 are mounted one above another for slidable movement across the throat area. The lower valve 32 is the main valve and is urged by a spring 34 to move to the left for completely closing the throat. A handle 35 formed on the externally projecting end of valve 32 is used to move the valve to open position, in which a valve opening 32' registers with the throat area to permit maximum flow of material. The valve 32 is retained in open position by an armature latch 36 released by energization of a magnet 37.

Valve 33 is the dribble valve and has a large opening 33' of the same size as opening 32' of the main valve and at the right of opening 33' has a small, dribble opening 33a. When valve 33 is moved by its handle 38 to the right, to open position, opening 33' registers with the throat area and permits the full flow of material. The dribble valve is retained in open position by an armature latch 39 controlled by a magnet 40. When magnet 40 is energized, latch 39 releases valve 33 and a spring 41 moves the valve to the left to locate dribble opening 33a within the throat area. This closes the throat except for the dribble opening, thereby diminishing the material flow to a dribble.

After closing the dribble valve 33, the main valve 32 is closed to completely shut off the material flow.

The energizations of magnets 40 and 37 in succession to successively close dribble valve 33 and main valve 32 are controlled by the load counterbalancing mechanism. For this purpose, indicator hand 20 rigidly carries at the upper end through insulation, a horizontally and then downwardly bent rod 44 of conductive material, and which may hereafter be referred to as the load responsive bridge or conductor. The path of the vertical portion of the bridge is intersected by the horizontal ends of a first pair of wires 45 and 45', the wire ends being in radial alinement. These wire ends are located at a selected dribble load point. A second pair of wires 46 and 46' is across the path of bridge 44, the second pair having the horizontally extending ends in radial alinement at a selected predetermined load point, which in the present case is the central, zero, graduation of chart 22.

The horizontal, projecting ends of wires 45 and 45' may be referred to as the dribble circuit terminals which when engaged by bridge 44 cause magnet 40 to be energized for permitting dribble valve 33 to move to its closing position in which the dribble opening 33a is within the throat area. The ends of wires 46 and 46' may be referred to as the shut-off circuit terminals, which when bridged by conductor 44 cause a circuit to be formed through magnet 37 for permitting valve 32 to move to closing position for completely shutting off the hopper flow.

Wires 45 and 45' are secured at their rear ends in a plate 47 of insulating material while wires 46 and 46' are carried at their rear ends by a similar plate 48. Plates 47 and 48 are respectively secured to slides 49 and 50 individually mounted for slidable movement along an arcuate guide bar 51 secured to the back of the scale frame and concentric with the axis of the pendulum hub assembly 18. The slide 49 is adjusted to position the dribble circuit terminals at a selected dribble load point to be bridged by conductor 44 when the latter reaches the dribble point. Slide 50 is adjusted to set the shut-off circuit terminals at the predetermined load or shut-off point to be bridged by conductor 44 when the latter reaches the predetermined load point.

Each of wires 45, 45', 46, and 46' is of thin, springy, material, such as phosphor bronze, and is formed near its fastened rear end with a horizontally disposed coil portion 52, which joins the horizontally projecting terminal end. Because of the coil portion, the terminal end is not restricted in its horizontal movement in either direction to any appreciable extent, the coil acting as an extremely yieldable or floating mounting for the terminal end. Due to the floating mounting of the wire terminal, which permits it full freedom of movement in either direction, the terminal yields to the engagement of bridge 44 without imposing any perceptible resistance to continuing movement of the bridge. When the bridge is moving in a certain direction and engages a wire terminal, the bridge deflects the terminal until the bridge has completely passed the terminal. The latter then is returned to its initial selected position and accurately maintained there by the inherent tendency of the coil portion 52 to retain its original formation.

Wires 45 and 46 are connected by a coiled connector 53 and wires 45' and 46' by a coiled connector 54, the coils of these connectors permitting the slides 49 and 50 carrying the wires to move apart or together when adjusting them to selected positions, without altering the connections between the wires.

In the modification shown in Fig. 5, only one pair of wire terminals 55 and 56 is provided. The wire terminals are carried in radial alinement by a plate 57 of insulating material fastened to a balanced lever 58, pivoted in coincidence with the axis of the pendulum hub 18. A spring 59 normally holds the lever in its counterclockwise position against an adjustable stop 60. In the normal position of the lever, the wire terminals are at the dribble load point. The lower arm of lever 58 is formed with a round armature 61 coacting with an electromagnet 62, which when energized, swings the lever clockwise to engagement with an adjustable stop 63. The wire terminals 55 and 56 are then at the predetermined load point. As will be brought out later, when the load responsive conductor bridges the terminals at the dribble load point, the dribble valve is caused to move to dribble position and simultaneously, magnet 62 is energized to position the terminals at the predetermined load point.

In addition to the circuit controllers described hereinbefore, the scale is also provided with a normally open safety switch 64 (see Fig. 2). One point of switch 64 is provided on a lower spring blade 65 and the companion point on an upper spring blade 66, both blades mounted on a fixed bracket 67. The upper blade is below and normally at a distance from the nose piece 15 of lever 14. When an excess of load, say five pounds, is applied to platform 10 due to failure of valves 32 and 33 to shut, the excess of load causes lever 14 to rock downwardly to such an extent as to engage nose piece 15 of the lever with upper blade 66 to close switch 64. The closing of switch 64 energizes magnets 37 and 40, independently of the load sensing bridge 44 and the wire terminals engaged thereby, thereby causing valves 32 and 33 to close and shut off further flow of material. The excess of load is indicated by sight line 21 on the over-weight side of chart 22.

The scale is also provided with a normally closed circuit breaker switch 68, one of the points of which is carried by an upper spring blade 69 and the other point of which is on a lower spring blade 70. Resting, through insulation, on blade 70 is a vertical rod 71 passing loosely through a hollow screw 72 screwed into the frame and held in adjusted position by a lock nut 73. The upper end of the screw is formed with an enlarged head 74 which serves as a stop to limit clockwise movement of beam 24.

Lower blade 70 tends to rise, close switch 68, and elevate rod 33 to a position in which its upper end projects slightly above the top of stop head 74. When the beam moves to its clockwise limit, it first engages the top of rod 71 and depresses the latter to open switch 68, and then comes to rest on head 74. Beam 24 is at the clockwise limit until the platform load reaches to within 5 lbs. of the predetermined load. The beam then starts rocking counterclockwise and releases rod 71, permitting switch 68 to close. The hopper control circuits are thereby conditioned for control by the automatic counterbalance circuit controllers, as will be brought out in connection with the circuit diagram, Fig. 6.

*Operation and circuits*

Referring to Fig. 1, the operator sets the capacity beam counterbalance for a desired predetermined load. Assume this load to be 105 lbs. 2 ozs. A loose weight or weights 76 are applied to hanger 26 to counteract 100 lbs. on the platform and poise 28 is set at the 5 lb. 2 oz. mark on graduated bar 27. The beam 24 is thereby overbalanced to its clockwise limit, against stop head 74, and is engaging rod 71 to cause switch 68 to be open. At the same time, pendulum 19 is in lowest position and sight line 21 at the extreme left of chart 22.

Referring to Fig. 6, the operator now closes main switch S. Following this, valves 32 and 33 are opened by pulling on their handles 35 and 38 (Fig. 4). The valves are now latched by armature latches 36 and 39 in open positions and the material is flowing from hopper 30, through throat 31, at a maximum rate. When 100 lbs. and 2 ozs. of material have been deposited on load receiver 10, the beam 24 and pendulum 18 start to rise, and index line 21 and its carrying hand 20 start moving to the right across chart 22. Conductive bridge 44 fast to hand 20 now is moving towards the dribble circuit terminals, formed by the ends of wires 45 and 45'. Further, as beam 24 started to rise, it permitted rod 71 to be elevated by spring blade 70 and switch 68 to close. When bridge 44 reaches the dribble load point, it engages and bridges the terminal ends of wires 45 and 45', forming the following circuit:

*Dribble initiating circuit.*—From the + line, through a sensitive relay coil 80, the terminal end of wire 45', switch 68, and to the — side.

Energization of sensitive relay 80 closes relay points 80a to form the following circuit:

*Relay coil 81 circuit.*—From the + line, through relay points 80a, coil 81, switch 68, and to the — side.

Coil 81 thereupon opens the normally closed relay points 81a and closes the normally closed relay points 81b. Closing of points 81b forms the following circuit:

*Relay coil 82 main circuit.*—From the + side, through contacts 81b, coil 82, switch 68, and to — side.

Coil 82 closes its relay points 82a to form a stick circuit of coil 82, by-passing relay contacts 81b. When the bridge 44 passes the dribble circuit terminals formed by the ends of wires 45 and 45', the circuits of sensitive relay 80 is opened, causing points 80a to open and break the circuit of coil 81, in turn, causing points 81b to reopen and break the main circuit of coil 82. Coil 82, however remains energized, through the stick circuit relay points 82a.

Coil 82, when energized, also closes relay contacts 82b to form the following parallel circuits:

*Dribble valve magnet 40.*—From the + side, through magnet 40, contacts 82b, switch 68, to the — side.

*Pilot light D.*—From the + side, through pilot light D, contacts 82b, switch 68, to the — side.

Light D indicates the closing of the dribble valve. Magnet 40, upon energization, releases latch 39 (Fig. 4) to permit spring 41 to move valve 33 to closing position, in which dribble opening 33a is within the area of throat 31. The flow of material through the throat is now regulated by opening 33a and the material is flowing onto platform 10 at a greatly diminished rate.

When conductor 44 bridged the dribble circuit terminals, coils 80, 81, and 82 were energized. Coil 82, in addition to closing contacts 82a for its stick circuit and contacts 82b for the dribble valve magnet circuit also closed contacts 82c in series with a relay coil 83. The circuit of the latter also goes through relay contacts 81a which are now open because coil 81 is energized. When the conductor 44 completely passes the dribble terminals (wires 45 and 45'), coils 80 and 81 are deenergized and contacts 81a close, to form the following circuit:

*Coil 83 main circuit.*—From the + side, through contacts 81a, contacts 82c, coil 83, switch 68, to the — side.

Coil 83 now closes contacts 83a to form a stick circuit for the coil, by-passing contacts 81a. Coil 83 also closes contacts 83b in series with a relay coil 84. The circuit of the latter also includes contacts 81c, now open.

When the predetermined weight of material has been deposited on platform 10, the conductor 44 engages terminals 46 and 46' to complete the following circuit:

*Shut-off initiating circuit.*—From the + line, through coil 80, terminal 46, bridge 44, terminal 46', switch 68, to the — side.

Coil 80 closes contacts 80a to again form the coil 81 circuit. Coil 81 opens contacts 81a but this does not deenergize coil 83 since coil 82 is still energized to maintain contacts 82c closed and since contacts 83a are now closed to form the stick circuit of coil 83. Accordingly, contacts 83b are still closed, and now with the second energization of coil 81 closing contacts 81c, the following circuit is formed:

*Coil 84 circuit.*—From the + side, through contacts 81c, contacts 83b, coil 84, switch 68, to the — side.

Coil 84 closes stick circuit contacts 84a to bypass contacts 81c and 83b. Coil 84 also closes contacts 84b to form the following parallel circuits:

*Main valve magnet circuit.*—From the + side, through magnet 37, contacts 84b, switch 68, to the — side.

*Pilot light M circuit.*—From the + side, through pilot light M, contacts 84b, switch 68, to the — side.

Light M indicates the closing of the main valve 32. Magnet 37 (also see Fig. 4) releases latch 36 from valve 32 permitting spring 34 to move the valve to position for closing the throat 31 entirely, thereby shutting off the flow of material to platform 10.

If because of failure of switch 68 to close or of terminals 45 and 45' or 46 and 46' to be bridged by conductor 44, the circuits required to shut valves 32 and 33 do not form, an excess of material flows onto platform 10. When this excess reaches about 5 lbs., nose piece 15 of multiplying lever 14 (see Fig. 2) engages upper blade 66 to depress it and positively close safety switch 64. Switch 64, when closed, forms the following circuit:

*Safety relay coil 86.*—From the + line, through switch 64, coil 86, directly to the — line.

Energization of coil 86 closes relay points 86a by-passing contacts 82b of the dribble valve and pilot light circuits and leading directly to the — line.

Coil 86 also closes relay points 86b similarly by-passing contacts 84b of the main valve and pilot light circuits and leading directly to the — side of the line.

Thus, closing of safety switch 64, as a result of an excess of load being applied to receiver 10, causes operation of the valves 32 and 33 and their pilot lights independently of circuit breaker 68 and the circuit controllers governed by the load responsive bridge 44. In this way, the flow of material is shut off when the normal controls for the valves fail to operate properly.

When the material deposited on platform 10 is removed, beam 24 returns to its clockwise limit and depresses rod 71 to open switch 68. The opening of switch 68 opens the stick circuits of coils 82, 83, and 84, as well as the circuits of valve magnets 37 and 40. The apparatus is now ready for another hopper load to be weighed out, and the operation is started by opening valves 32 and 33.

In above manner, successive energizations of a sensitive relay coil 80 acting through another, less sensitive relay 81, control successive operations of a pair of valves 33 and 32, the first to diminish the material feed and the second to shut off the feed entirely.

For the form of circuit controller shown in Fig. 5 in the circuit is essentially as shown in Fig. 6, with substitution of the single pair of wire terminals 55—56 for the two pairs of terminals 45—45' and 46—46' of the main form, and with the addition of a branch circuit for magnet 62 of Fig. 5. Thus sensitive coil 80 would be energized at the dribble load point through conductor 44 bridging wire terminals 55 and 56 in their initial or normal dribble point location.

Energization of coil 80 would set the train of events in motion, in the manner previously explained, to cause dribble valve 33 to move to its closing position. In this case, coil 82', corresponding to coil 82 of Fig. 6, is provided with an additional pair of relay contacts 82d which, as indicated in Fig. 5, close to form the circuit of electromagnet 62. Thus, the latter would be energized simultaneously with operation of the dribble valve 33. Energization of magnet 62 swings wire terminals 55 and 56 to the predetermined weight point to be bridged by conductor 44 when the required hopper load has been measured out. When this predetermined load has been reached, conductor 44 engages terminals 55 and 56 to effect a second energization of coil 80, resulting, in the manner previously explained, in operation of shut-off valve 32.

While the invention has been disclosed in the illustrated forms, it is understood that variations and departures from these forms may be made without departing from the spirit or field of the invention. It is therefore intended to be limited only in accordance with the following claims.

We claim:

1. A scale for measuring out predetermined weights of material; comprising weighing mechanism including a load receiver, material feeding means for feeding material to the receiver, a relay coil, means controlled by the weighing mechanism in response to successive additions of weight of material to the receiver for effecting successive energizations of the relay coil, circuits controlled by the coil, and means controlled by the circuits upon successive energizations of the coil for first diminishing the feed of material as the predetermined weight is approached and then for cutting off the feed entirely as the predetermined weight is reached.

2. A scale for measuring out predetermined weights of material; comprising weighing mechanism including a load receiver, means for depositing material on the receiver, a relay coil, means controlled by the weighing mechanism upon movement thereof in response to weight of material deposited on the receiver for effecting in succession a preliminary energization of the coil before the predetermined weight of material has been deposited and for subsequently effecting an energization of the coil when the predetermined weight of material has been deposited, a circuit controlled by the relay coil upon its preliminary energization for diminishing the rate of deposit of the material upon the receiver, and a circuit controlled by the relay coil upon its subsequent energization for stopping entirely the depositing of material upon the receiver.

3. A scale for measuring out predetermined weights of material; comprising weighing mechanism including a load receiver, a source of supply for the material and from which the material flows onto the receiver, a relay coil, means controlled by the weighing mechanism upon movement thereof in response to successive additions of weight of material applied to the receiver for effecting successive, but momentary, energizations of the coil, circuits controlled by the coil upon one momentary energization of the latter for diminishing the flow of material from said source to the receiver, means for completely shutting off the material flow, and means controlled jointly by said circuits and by said relay coil upon a subsequent energization of the latter for causing operation of the means which completely shuts off the material flow.

4. A scale for measuring out predetermined weights of material; comprising weighing mechanism including a load receiver, means for depositing material upon the receiver, a sensitive relay, means controlled by the weighing mechanism in response to successive additions of weight of material deposited on the receiver for effecting successive operations of the sensitive relay, a less sensitive relay operated by the sensitive relay upon each operation of the latter, and circuits controlled by the less sensitive relay upon successive energizations of the latter for first diminishing the rate of deposit of the material on the receiver and then stopping the depositing of the material entirely.

5. A scale for measuring out predetermined weights of material comprising weighing mechanism including a load receiver, means for depositing material upon the receiver, means for diminishing the rate of deposit of material, a circuit controlling the latter means, means for stopping the deposit of material, a second circuit controlling the latter means, a relay coil, means controlled by the weighing mechanism upon movement thereof in response to successive additions of weight of material deposited on the receiver for effecting successive energizations of the relay coil, means controlled by the relay coil upon one energization of the latter for closing the first-named circuit and for simultaneously preliminarily conditioning the second circuit for completion, and means controlled by the relay coil upon a subsequent energization of the latter for completing the preliminarily conditioned second circuit to thereby stop the deposit of material.

6. A scale for measuring out predetermined weights of material; comprising weighing mechanism including a load responsive device movable proportionately to weight and a load receiver, a hopper from which the material flows to the receiver, a dribble valve for diminishing the flow of material, a main valve for stopping the flow of material, a magnet for controlling operation of the dribble valve and a circuit for said magnet, a second magnet for controlling operation of the main valve and a circuit for the second magnet, a relay coil, means for detecting the successive arrival of the load responsive device at a dribble load point and at a more advanced predetermined load point, means controlled by the detecting means upon sensing arrival of the device at the dribble load point for effecting a first energization of the coil and upon detecting arrival of the device at the predetermined load point for repeating energization of the coil, means controlled by the coil, upon its first energization for controlling the dribble valve magnet circuit to cause the dribble valve to diminish material flow, means effective upon breaking of the first energization of the coil for preliminarily conditioning the main valve magnet circuit for a control operation, and means operable upon the second energization of the coil for rendering the preliminarily conditioned main valve magnet circuit fully effective to cause the main valve to shut off material flow.

7. A scale for measuring out predetermined weights of material; comprising weighing mechanism including a load receiver and a load responsive conductive bridge variably movable in accordance with the weight of material on the receiver, means for depositing material upon the receiver, a pair of dribble point contacts located in the path of movement of the aforesaid bridge and bridged by the latter before the predetermined weight of material has been deposited, a relay coil energized upon the bridging of said dribble point contacts by said conductive bridge, circuits controlled by the aforesaid energization of the coil for diminishing the rate of deposit of the material on the receiver, a second pair of contacts engaged by the aforesaid conductive bridge when the predetermined weight of the material has been deposited on the receiver for again energizing said relay coil, and electrical means controlled by said relay coil upon its second energization for stopping the depositing of material on the receiver.

8. A scale for measuring out predetermined weights of material; comprising weighing mechanism including a load receiver and a load responsive contactor movable through a certain weight range, a hopper from which material flows to the receiver, a dribble valve for diminishing the flow of material, a main valve for shutting off the flow of material, contact means initially located at a dribble load point and engaged by said contactor when sufficient weight of material has been deposited on the receiver to effect movement of the contactor to the dribble load point, means controlled by engagement of the contactor with the contact means at the dribble load point for causing operation of the dribble valve to diminish the material flow, means simultaneously controlled by the engagement of the contactor with the contact means at the dribble load point for shifting the contact means to a more advanced load point, and means controlled by engagement of the contactor with the contactor means at the advanced load point for operating the main valve to shut off the material flow.

9. A scale for measuring out predetermined weights of material to a load receiver, comprising a load responsive control element movable through a given weight range different points of which correspond to different weights of material on the receiver, means for feeding material to the receiver, a control device preliminarily stationed at a selected point of said weight range in advance of the point corresponding to the predetermined weight to be measured out, means controlled by coaction of the control device with the control element upon arrival of the element at the said selected point for causing the feed of material to the receiver to be diminished, means also controlled by the aforementioned coaction for shifting the control device ahead to the predetermined weight point of said range, and means controlled by subsequent coaction of the control device and element upon arrival of the element at the predetermined weight point for stopping the feed of material to the receiver.

10. Control means for apparatus, comprising weighing mechanism including load responsive means movable through a certain weight range, a device having a preliminary position at a certain load point for coacting with the load responsive means to preliminarily control operation of said apparatus, and other means controlled by coaction of the device and the load responsive means in said preliminary position for shifting the device to an advanced load point for coacting with the load responsive means when the latter arrives at the latter load point for effecting a second control operation of the said apparatus.

11. A scale for weighing predetermined amounts of material; comprising weighing mechanism including a load receiver; material feeding means to feed material to the receiver, a magnet operated to cause the feeding means to stop feed of material, control means governed by operation of the weighing mechanism for effecting the operation of the magnet to cause the material feed to stop when a predetermined weight of material has been applied to the receiver, and other control means subsequently governable by operation of the weighing mechanism for independently operating the magnet for causing the feed of material to stop when an excess of material has been fed to the receiver due to failure of the first-named control means to function.

MATTHEW T. THORSSON.
ALBERT C. HOLT.